United States Patent [19]
Mocker et al.

[11] Patent Number: 5,128,794
[45] Date of Patent: Jul. 7, 1992

[54] SCANNING LASER HELMET MOUNTED SIGHT

[75] Inventors: Hans W. Mocker, Minneapolis; John E. Overland, Plymouth, both of Minn.

[73] Assignee: Honeywell Inc., Minneapolis, Minn.

[21] Appl. No.: 589,734

[22] Filed: Dec. 31, 1990

[51] Int. Cl.⁵ .......................................... G02B 26/10
[52] U.S. Cl. .................................. 359/196; 359/221; 359/529; 364/559; 364/514; 356/152; 340/980
[58] Field of Search ............... 359/196, 529, 213, 221, 359/216, 217, 218, 219; 250/334; 340/980; 356/141, 152, 222; 364/514, 559, 569, 574

[56] References Cited

U.S. PATENT DOCUMENTS

| | | | |
|---|---|---|---|
| 4,111,555 | 9/1978 | Ellis | 356/141 |
| 4,193,689 | 3/1980 | Reymound et al. | 356/152 |
| 4,209,254 | 6/1980 | Reymond et al. | 356/152 |
| 4,315,240 | 2/1982 | Spooner | 340/980 |
| 4,315,241 | 2/1982 | Spooner | 340/980 |
| 4,315,690 | 2/1982 | Trocellier et al. | 356/152 |
| 4,574,197 | 3/1986 | Kliever | 250/334 |
| 4,649,504 | 3/1987 | Krouglicof et al. | 364/559 |
| 4,684,249 | 8/1987 | Ellis | 356/152 |
| 4,884,219 | 11/1989 | Waldren | 364/514 |

*Primary Examiner*—Loha Ben
*Attorney, Agent, or Firm*—John G. Shudy, Jr.

[57] ABSTRACT

A scanning laser helmet mounted sight that determines helmet or sight position from externally mounted light sources and detectors. No electronics, including light sources and detectors, are on the helmet. Also, no electrical cables or mechanical linkage is connected to the helmet. The helmet has passive reflectors for reflecting a scanning light beam from a laser source. The return times and directions of the returning light beam relative to a return of a light beam from a reference point, processed by the off-helmet electronics, result in a position indication of the helmet.

6 Claims, 10 Drawing Sheets

SCANNING LASER HELMET MOUNTED SIGHT

FIELD OF THE INVENTION

The invention relates to a system for non-contact detection of the position and orientation of an object in space. Particularly, the invention relates to a system for monitoring the position and orientation of a pilot's helmet within the cockpit of a high performance tactical helicopter. More particularly, the invention relates to a helmet mounted sight.

BACKGROUND OF THE INVENTION

A variety of helmet monitoring systems exist in the art. Some electro-optic devices use rotating mirrors and a conventional light source, depending upon the number of observable helmet mounted sensors. These devices may be used in roll or non-roll applications. Without roll information, the use of the helmet monitoring system is limited to the low G helicopter environment where the pilot can keep his head upright. Accuracy is limited by spot size of the light and the linearity of rotating scan mirrors. Reliability is limited by mechanically moving parts such as the rotating mirrors.

Some magnetic devices exist in the art. For instance, the magnetic helmet sight provides complete X, Y, Z, pitch, roll and your (6-axis) information. Its accuracy is limited by cockpit metal induced distortions of magnetic fields. Since helmet mounted metal is difficult to compensate for, accuracy is significantly reduced in an integrated magnetic helmet sight or display system.

The related art pertaining to helmet sights has light sources located on the helmet and detector configurations (i.e., spatially extended array) mounted in the cockpit. Thus, the employed sources on the helmet must be powered via cables and connectors from the cockpit. These approaches restrict the maneuverability of the pilot and add additional weight to the helmet which is a disadvantage in a high-g maneuver. In addition, logistics problems do exist if the pilot's helmet after mounting needs to be connected by special personnel.

In contrast, the present invention neither the light source (semiconductor laser) nor the detector are mounted to the helmet but are both mounted in the cockpit. Only passive means such as engraved grooves or corner cubes are located at the helmet. This results in the significant advantages over the related art. There is no increase in helmet weight which is important for high-g maneuvers (8-10 g) of modern fighter aircraft. The use of near-infrared laser sources (i.e., InGaAsP laser at 1.54 microns) results in complete eye-safety for the pilot and no light emergence from the cockpit. Sources and detectors can be co-located (i.e., common transmit-receive optics) resulting in a minimum of mounts in the cockpit.

SUMMARY OF THE INVENTION

The present invention is a helmet mounted sight which determines the helmet position from externally mounted light sources and detectors with no such means attached to the helmet. The technique utilizes a scanning laser approach. The light source or laser may be a near infrared (0.784 to 0.83 micron) GaAlAs semiconductor laser diode. The laser beam is scanned in the horizontal plane (i.e., azimuthal plane) and focused on the helmet. Engraved on the helmet is a specific pattern of a fine sinusoidal or triangular groove or a continuous line of small corner cubes. The remaining portion of a helmet surface is of a dull finish. Whenever a light beam from the light source scans over the groove or cubes on the helmet, a light pulse is returned from the helmet and the return time of the light is measured with respect to the return of the light beam from a reference angle (i.e., angular encoder). High position accuracy of the helmet may be achieved with a very small groove or corner cube and a laser beam having a beam waist comparable to the groove or cube dimensions. Two scanning transmitter/receivers are used in order to obtain three dimensional position and roll information of the helmet.

DESCRIPTION OF THE PREFERRED EMBODIMENT

Figure 1A:
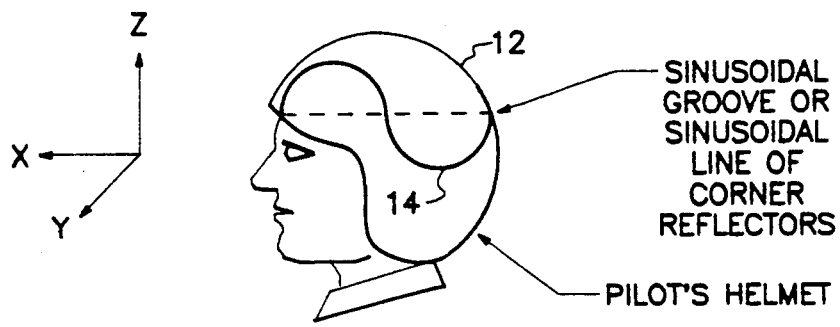
FIGS. 1a and 1b indicate the double side-looking geometry for the laser helmet sight.
Figure 1B:
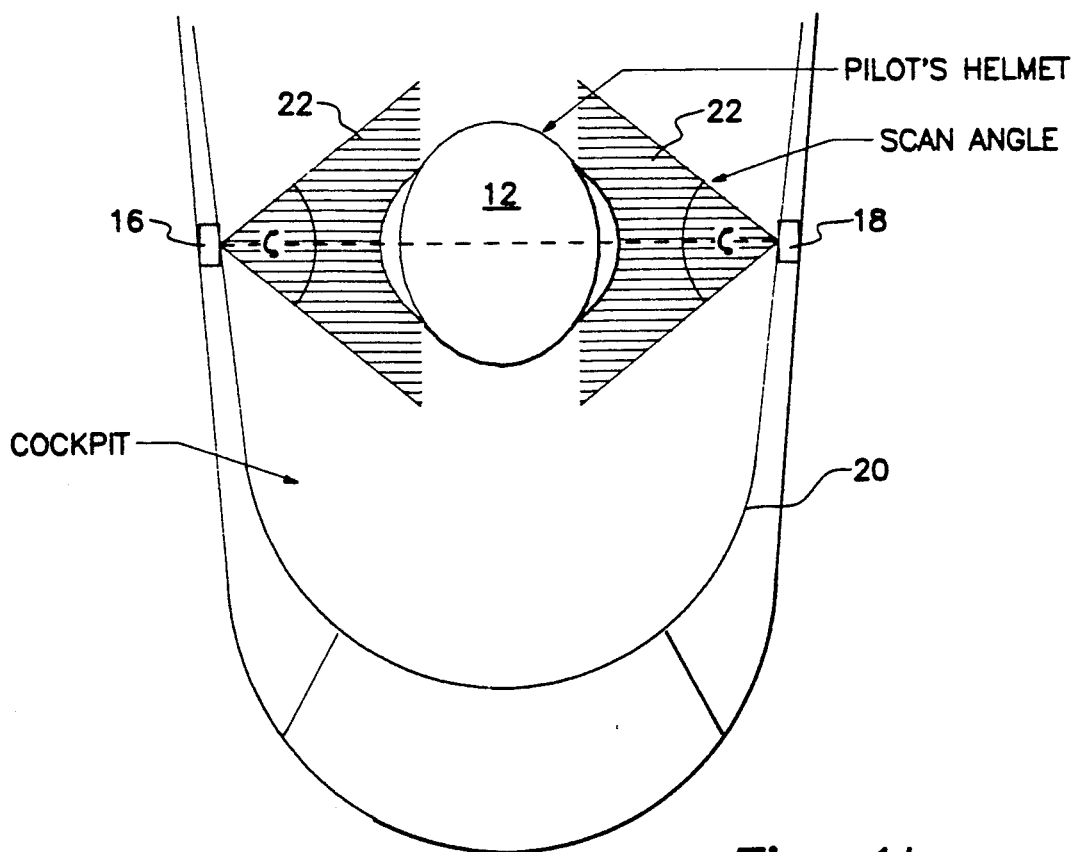
Figure 2A:
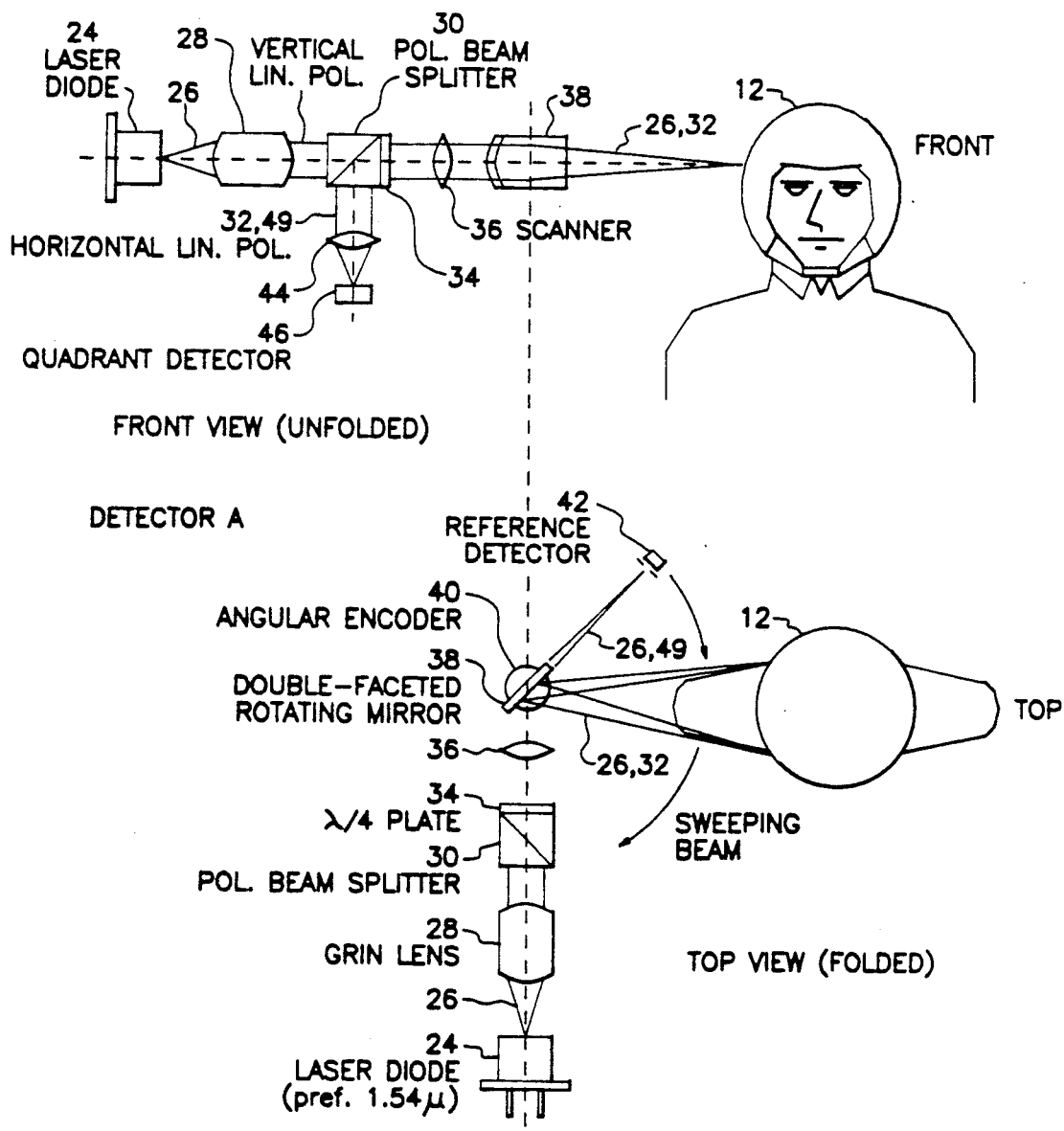
FIGS. 2a and 2b reveal an optical configuration of the invention.
Figure 2B:
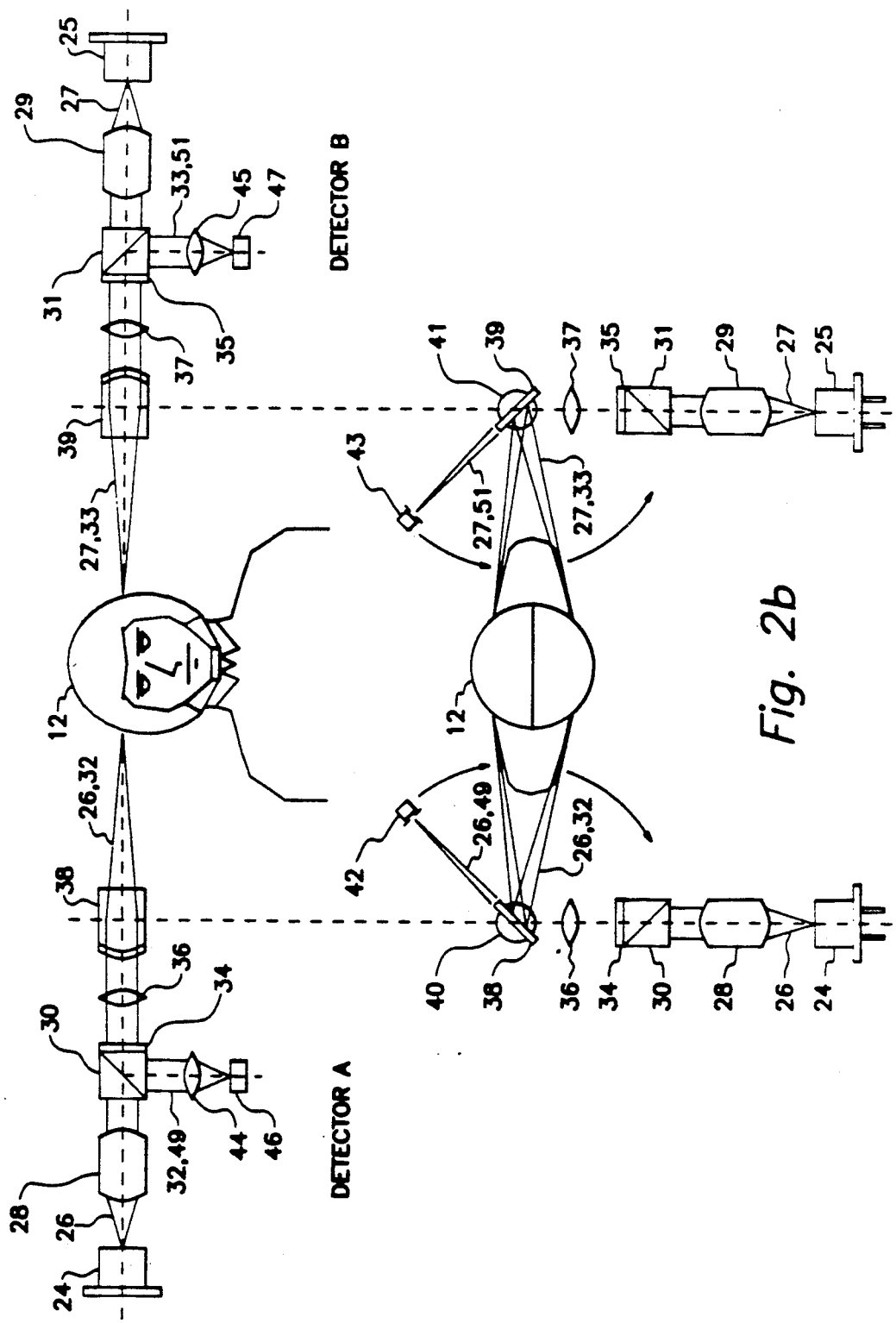

FIGS. 1a and 1b show a basic layout for the laser helmet sight configuration. Helmet 12 incorporates a sinusoidal groove 14 or sinusoidal line of corner reflectors 14. Scanning receivers 16 and 18, attached to cockpit 20, have a scanning area 22 that encompasses groove 14 of helmet 12 for a positional determination of helmet 12. FIG. 2 illustrates optical configuration of the transmit-receive laser helmet sight system. FIG. 2a shows one half of the transmit receive laser helmet sight system which is located on one side of the helmet. This is known as detector A. FIG. 2b shows the other half of the system which is located on the other side of the helmet. This is known as detector B. In FIG. 2a, laser diode 24 mounted in a TO5-can emits a linear polarized (P-plane) near-infrared beam 26. Beam 26 enters a grin lens 28 (i.e., gradient index lens) which collimates laser beam 26 before it enters a polarization beam splitter (PBS)-λ/4 plate combination 30. Combination 30 separates outgoing laser beam 26 from a back/reflected beam 32. Outgoing P-polarized beam 26 passes through PBS 30 with no losses and is converted into elliptically polarized light by passing through λ/4-plate 34. A focusing lens 36 focuses laser beam 26 onto helmet 12 after beam 26 passes through beam deflector 38 having a double faceted mirror attached to a shaft of a motor 40. Motor 40 rotates mirror 38 so as to sweep beam 26 across helmet 12 and reference detector 42. Scanning laser beam 26 is scanned in an horizontal plane relative to cockpit 20. Whenever laser beam 26 "falls" into a retro-reflecting groove 14 on helmet 12, beam 32 is reflected back through the rotating scanner, lens 36, λ/4 plate 34 and polarized beam splitter 30. Polarized beam splitter 30 reflects beam 32, not back through lens 28 through which beam 26 comes, but is reflected in another direction through lens 44 and to quadrant detector 46. During the return of beam 32 as it encounters λ/4 plate 34, elliptically polarized return beam 32 is converted into linear polarized light beam 32 in the S-plane. With respect to laser diode 24, a diode emitting at 0.8 micron (GaAlAs) is preferable to a 1.54 micron (InGaAsP) diode for reasons of lower cost. However, the 1.54 micron diode is preferable for the reasons of eye safety. If 0.8 micron diodes are used, Si detectors are the logical choice. If 1.54 micron lasers are used, then InGaAsP pin detectors should be used.

Detector B's operation, as shown in FIG. 2b, is substantially identical to detector A's. The only difference being the detector B scans the opposite side of the helmet. The components in FIG. 2b are the laser diode 25, grin lens 29, beam splitter 31, λ/4 plate 35, focussing lens 37, beam deflector 39, motor 41, and reference detector 43. Linear polarized near infrared laser beam 27 is reflected from the helmet as beam 33. Return pulse 51 is reflected back from the reference detector 43.

Figure 3:
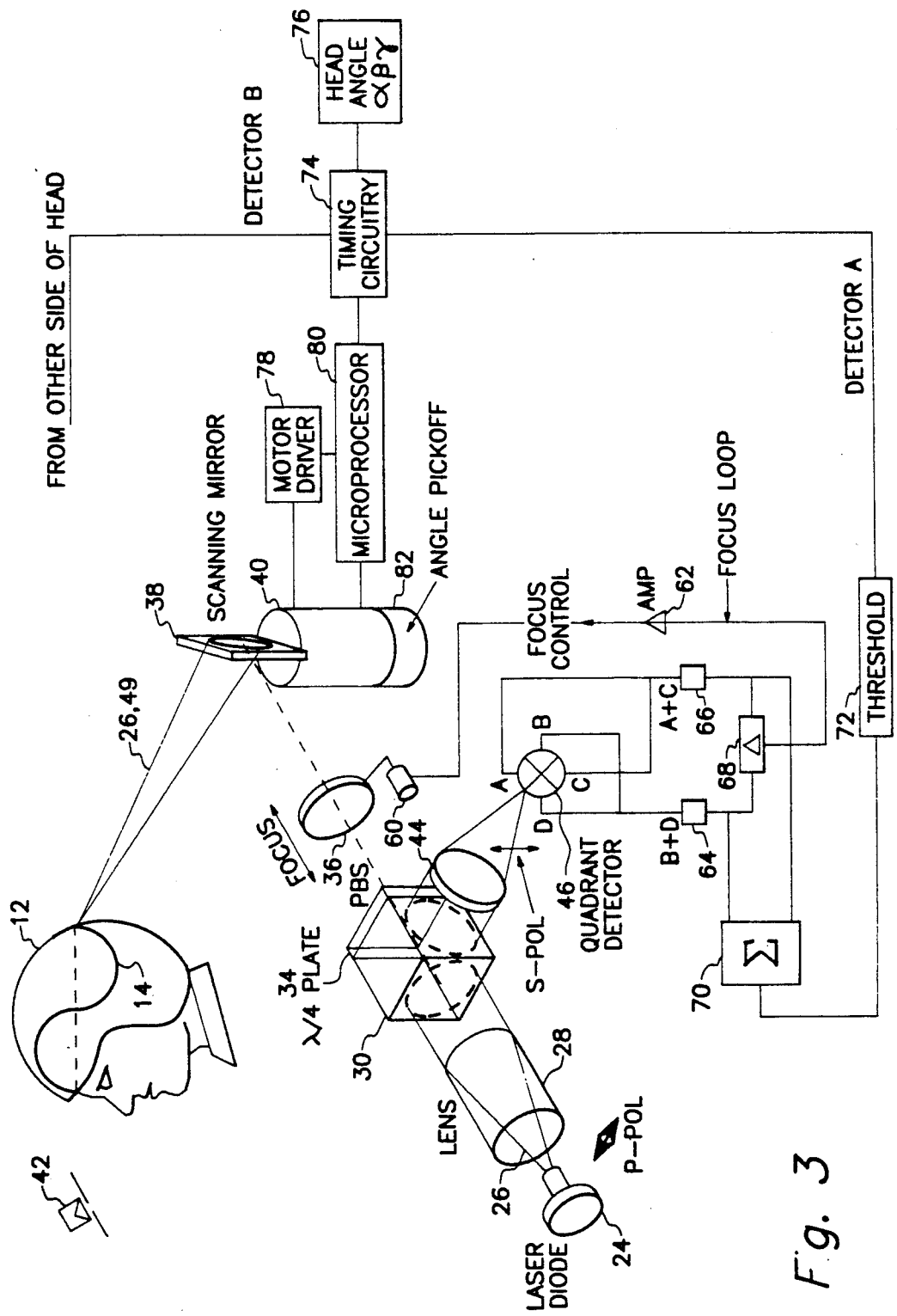
FIG. 3 shows a laser scanning apparatus, timing arrangement and focus control for a detector.
Figure 4:
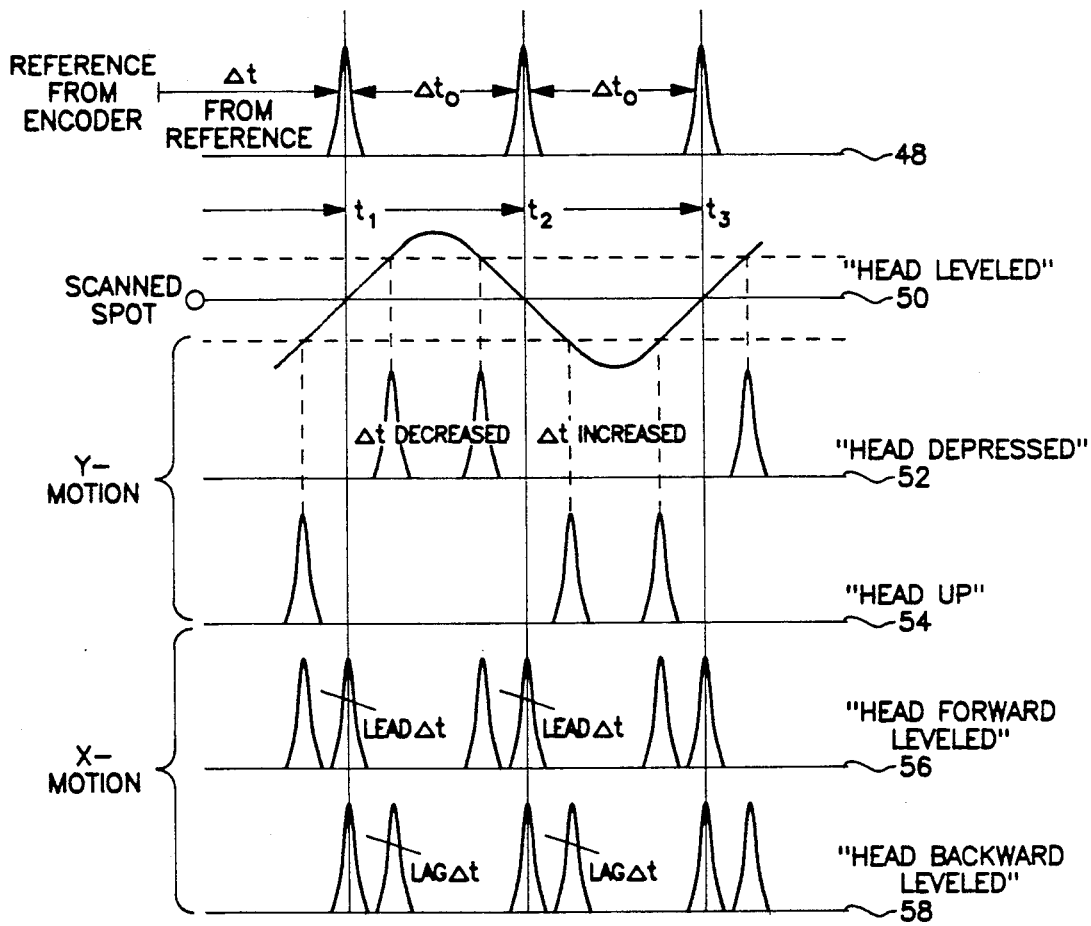
FIGS. 4 and 5 are graphs of return signal sequencing for various positions of a helmet.

The derivation of helmet 12 position information is illustrated in FIG. 3. Scan motor 40 rotates mirror 38 in a fashion such that laser beam 26 is being swept in a horizontal plane and across helmet 12. Laser beam 26 sweeps reflective pattern 14 of helmet 12 resulting in return beam 32, in timing with respect to reference detector 42 which is characteristic to the location of helmet 12. Helmet 12 has a sinusoidal or triangular reflective groove of at least one cycle. After the system has been properly adjusted, laser beam 26 scans reflective pattern 14 in a center symmetric position so that three return pulses 51 of equal spacing $\Delta T_0$ are obtained with a delay $\Delta T$ from reference detector 42 as shown in graph 48 of FIG. 4. Scan spot is shown in graph 50 of FIG. 4 and the pulses from the reference detector for a level head is shown in graph 48. If helmet 12 moves in the ±y direction ("head up" or "head depressed"), $\Delta T_0$ now either increases ("head up") or decreases ("head depressed") during the first half of the cycle of reflective patter graph 50. The pulse relationship for increasing the y position which is "head up" is shown in graph 54 and decrease in y direction which is "head depressed" as shown in graph 52. For motion of helmet 12 in the ±x axis ("head forward level" or "head backward level"), the interval $\Delta T_0$ remains the same but the train of three pulses leads or lags so that $\Delta T$ either decreases or increases for a forward or backward motion, respectively, as shown in graphs 56 and 58 of FIG. 4.

FIG. 3 has lens 36 which is adjusted by focus control motor 60 which receives the focus control signal from amplifier 62 in the focus loop. Quadrant detector 46 has four outputs A, B, C and D wherein B and D are summed together by unit 64 and A and C are summed together by unit 66. Outputs 64 and 66 are joined by unit 68 to provide focus loop signals to amplifier 62 for focus control of lens 36 by motor 60. Outputs of 64 and 66 go to summer 70 whose output goes to threshold indicator 72. The output of threshold indicator 72 is the signal output for detector A for one side of helmet 12. Detector A signal goes to timing circuitry 74 which also receives a detector B signal from the other side of helmet 12. One output of timing circuitry 74 goes to head angle indicator 76 for indicating angle position of helmet 12. Motor 40 receives its power from motor driver 78. Angle of scanning mirror 38 is provided to microprocessor 80 by angle pickoff indicator 82. Microprocessor 80 also receives timing information from timing circuitry 74. Data is processed by microprocessor 80 for target acquisition.

Figure 10:
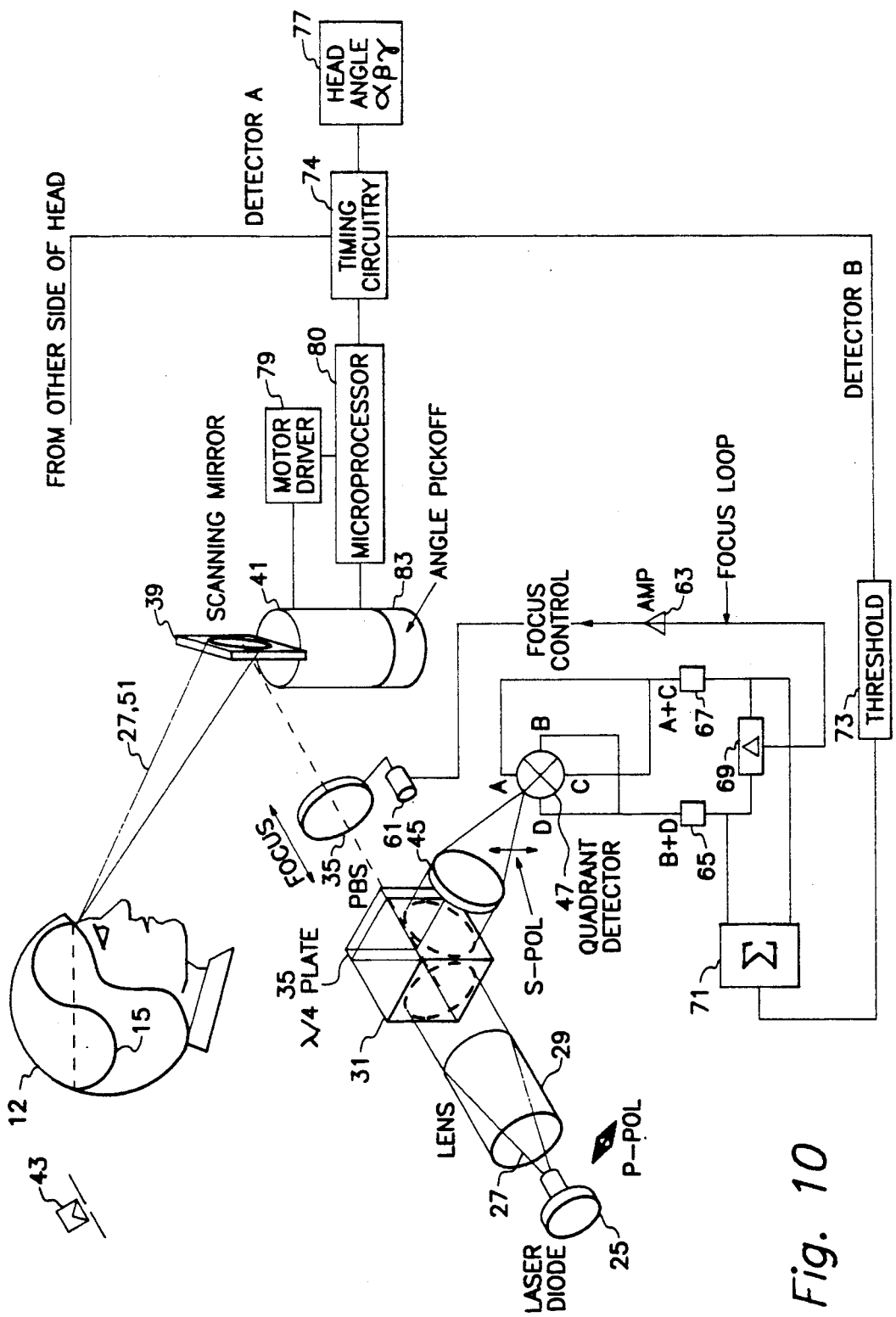
FIG. 10 shows a laser scanning apparatus, timing arrangement and focus control for another detector.

As seen in FIG. 10, the scanning apparatus, timing arrangement, and focus control for detector B is identical to detector A. The operation of detector B is nearly identical to the operation of detector A, the only difference being that detector B scans reflective pattern 15 on the opposite side of helmet 12 from detector A. The elements of detector B include the focus control motor 61, amplifier 63, quadrant detector 47, unit 65, unit 67, unit 69, summer 71, and threshold indicator 73. Both detectors A and B input into timing circuitry 74 and the microprocessor 80. Motor 41 receives its power from motor drive 79 and the angle of the scanning mirror is provided by angle pickoff indicator 83.

Figure 5:
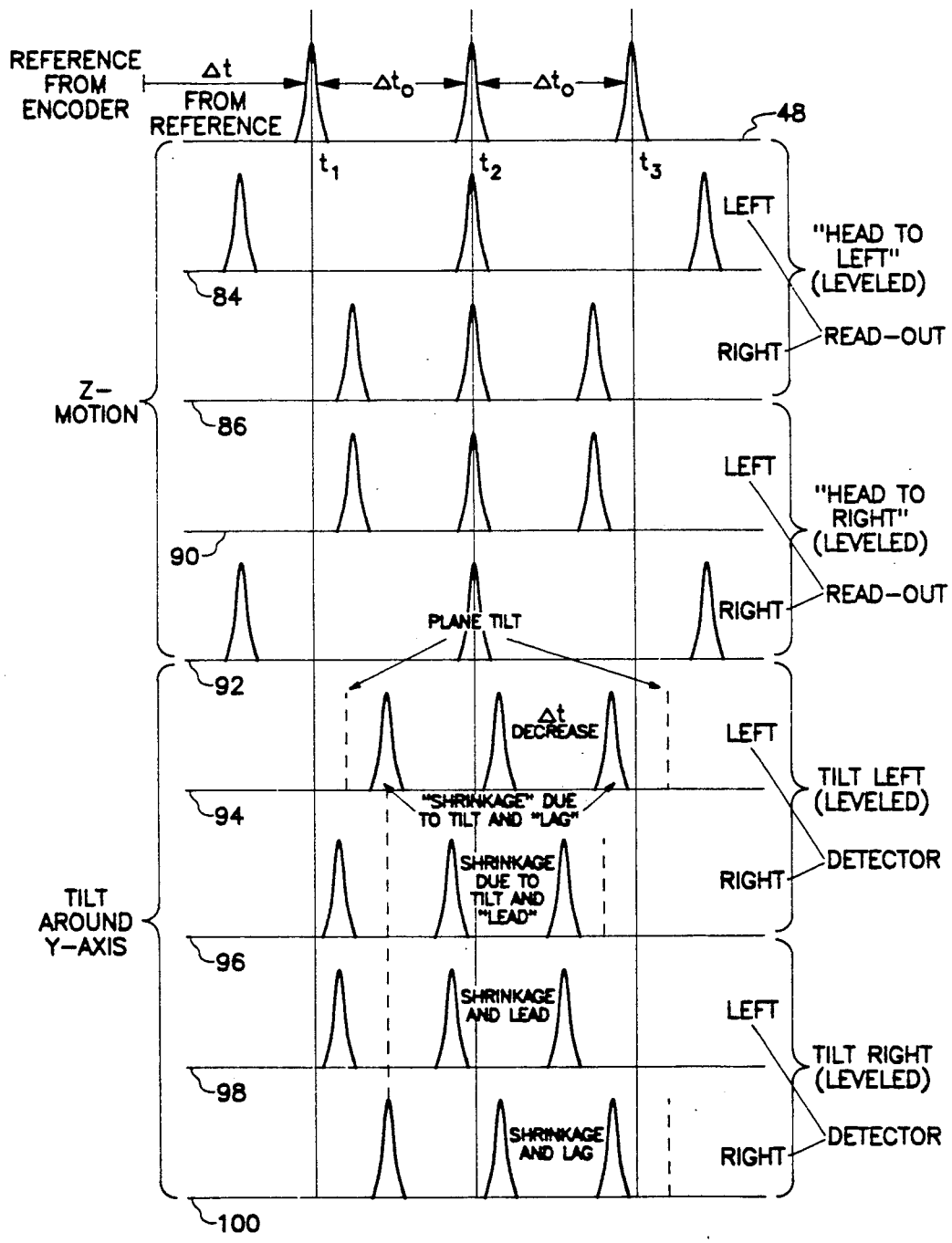

FIG. 5 continues revealing graphs concerning return signal sequencing and position of helmet 12. Timing conditions for head movement in the ±z direction are shown in the graphs 84, 86, 90 and 92. Graphs 84 and 86 show the leveled head to the left. Graphs 90 and 92 show the leveled head to the right. The conditions for head tilting around the y axis are shown in graphs 94, 96, 98 and 100. Two sets of transmitter/receivers (one on each side of helmet 12) provide readout. For the ±z motion, one obtains an increase or decrease in $\Delta T_0$ for +z and/or −z motion, respectively.

Figure 6:
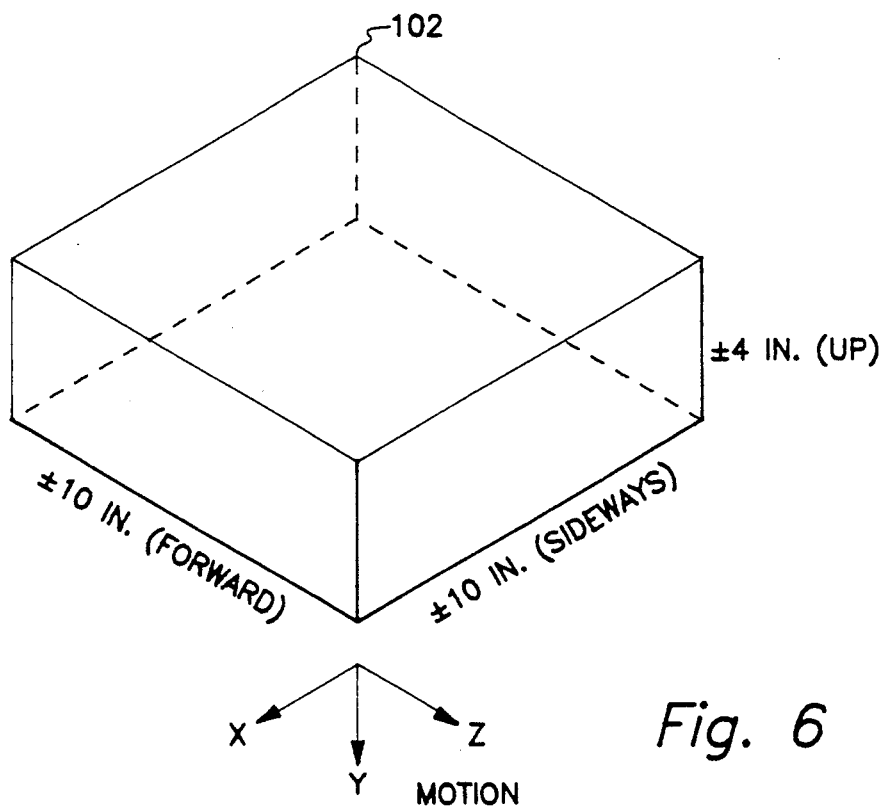
FIG. 6 illustrates a motion box for the helmet.

All three coordinates x, y and z, can be read out with one transmitter/receiver system. Measurement of tilt (i.e., around y axis) requires the input of two transmitter/receiver systems, one located on each side of helmet 12. A tilt typically results in a reduction of $\Delta T_0$ and a lead or lag depending on whether the tilt is seen by the left or right transmitter/receiver. FIG. 6 shows the dimensions of motion box 102. The size of motion box 102 is developed in relation to cockpit 20 size. Motion box size is depended on whether the invention is used for fighter aircraft or helicopters. For fighter aircraft motion box 102 may be smaller but so also the distances from helmet 12 to cockpit 20.

Figure 7:
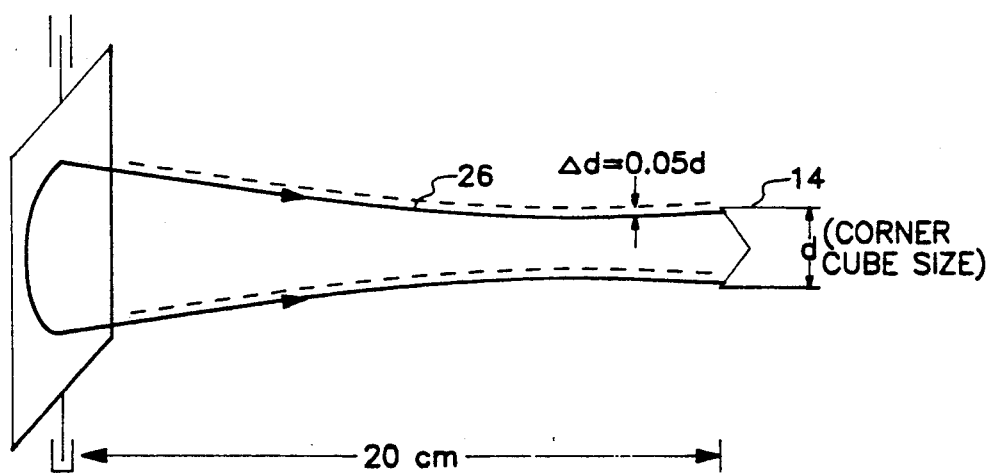
FIG. 7 indicates the laser beam spot size and length to a reflective corner cube.

Beam spot size and corner cube size is illustrated in FIG. 7. A focusing pattern must be had that gives a small spot size and a necessary depth of focus. Such approach assumes a Gaussian beam profile of laser beam 26 where the intensity is given by the following equation:

$$I = I_o e^{-(2r^2/w^2)}$$

where w = Gaussian radius (i.e., radius where intensity is at $1/e^2$ points = $0.135 I_o$) The region of focus (or depth of focus) is given by the equation:

$$w = w_o \left[ 1 + \left( \frac{\lambda z}{\pi w_o^2} \right)^2 \right]^{\frac{1}{2}}$$

where w is the beam waist at the distance z from the waist. Often the depth of focus is quoted when the power density of 90% of the power density at focus;

$$\text{then } w = 1.054 \, w_o \text{ and } z = \pm \frac{\pi}{12} \cdot \frac{w_o^2}{\lambda}.$$

The usable depth of focus is thus 2z. $w_o$ is the spot diameter at focus and is given by the equation:

$$w_o = \frac{4}{\lambda} \times \frac{\lambda \cdot f}{D}$$

Typical parameters for an optical system for the present laser helmet sight are: optics diameter D=0.5 to 1.0 cm; focal length f=10 to 20 cm; and laser wavelength $\lambda$=0.83$\mu$ or 1.54$\mu$.

The smallest spot diameters are achieved with small $\lambda$ and f and large D, i.e., $\lambda$=0.8$\mu$; f=10 cm and D=1.0 cm yields $w_o$=5$\mu$. The largest spot diameter is obtained with large $\lambda$ and f and small D; i.e., $\lambda$=1.54$\mu$; f=20 cm and D=0.5 cm yields $w_o$=80$\mu$. A most likely configuration (i.e., eyesafe) may look like this: $\lambda$=1.54$\mu$; f=20 cm D=1.0 cm yielding a spot size of 40$\mu$. The corresponding depth of focus for this condition is 2z$\approx$1000$\mu$=0.1 cm, i.e., rather small. This low depth of focus suggests that dynamic focusing is required. Optimum angular sensitivity is achieved if the beam diameter at the corner cube is of the dimensions of the corner cube as illustrated in FIG. 7. The minimum angular resolution we would like to obtain is 1 mrad.

Assuming that 5% intensity change can be registered by a threshold detector, we obtain vd=0.05 d and $\Delta$/f$\approx$1 mrad. This leads us to the maximum spot size and corner cube size of d=0.1 cm=1 mm=±0.5 mm. Since the total head motion is in the order of 8″=20 cm (or ±10 cm), the total servo correctability is in the order of 200:1.

To achieve focus control, an electro-opto-mechanical system must be employed that can keep the point of focus on helmet 12. Such a technique uses optical sensing by means of quadrant detector 46, electronic control and compensation and electro-mechanical positioning (of lenses or similar elements). The focus control must maintain the point of focus of laser beam 26 on helmet 12 under all motion conditions of the pilot's head within motion box 102. Since head motions of not more than 10 mm may occur within 10 msec (or head velocities of $10^2$ cm/sec) a frequency response of the servo loop of 1 kHz appears to be sufficient.

Several Optical techniques, used to derive a discriminant for the focus sensor, are astigmatic lens approach, knife edge technique, critical angle prism, and waxwane method.

Figure 8A:
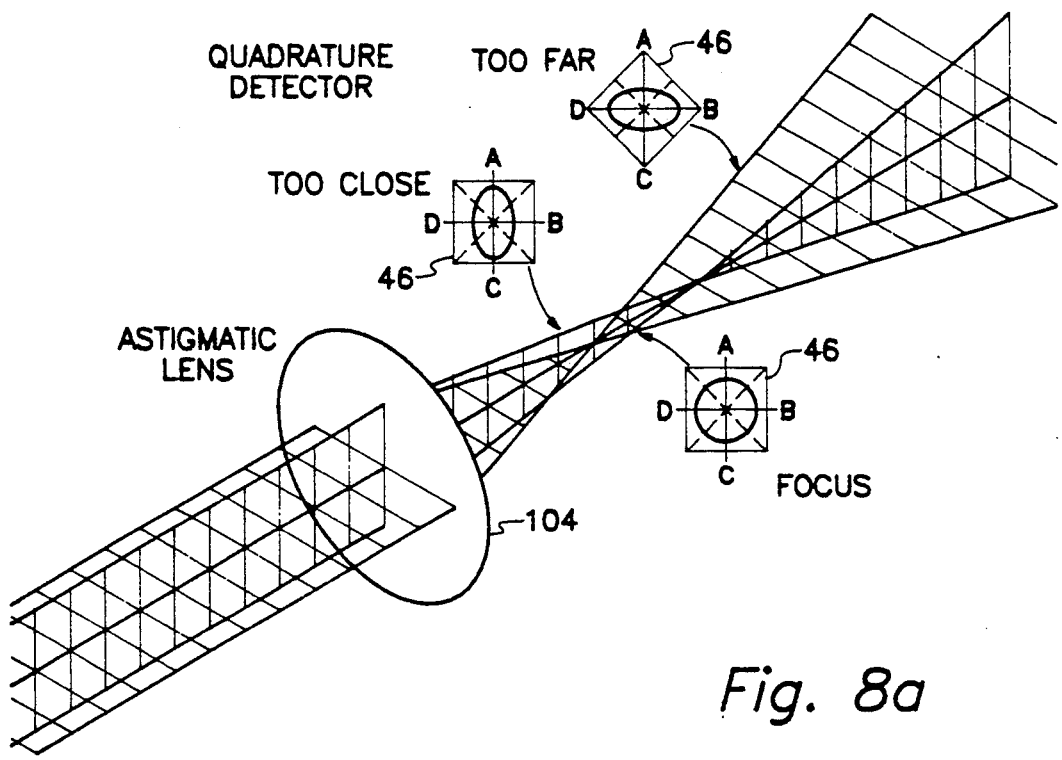
FIGS. 8a and 8b illustrate a transformation of a reflected beam by an astigmatic lens.
Figure 8B:
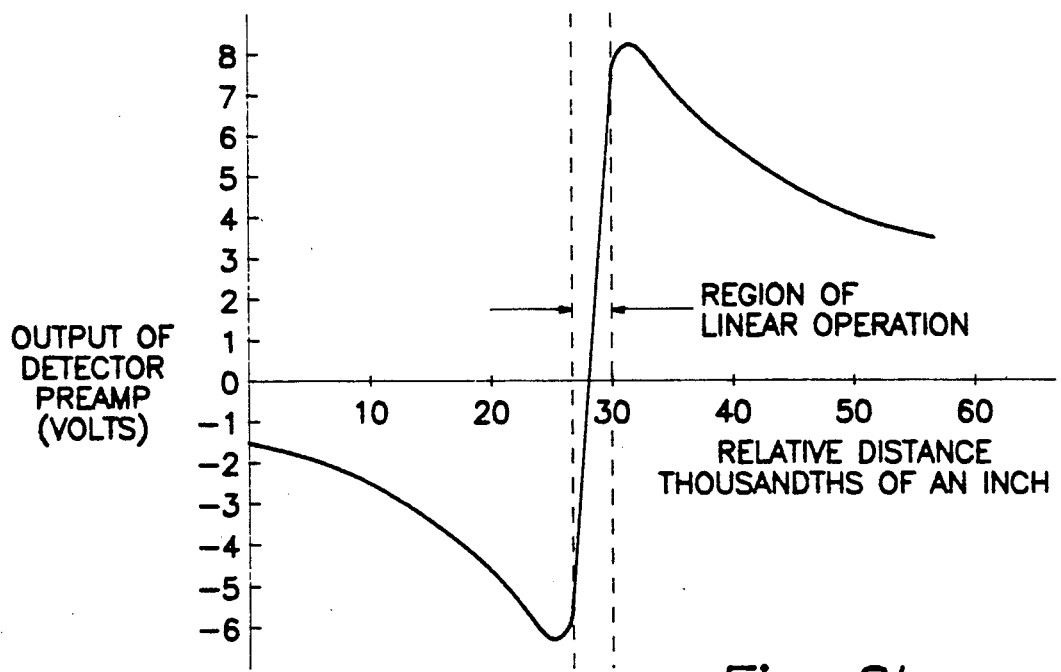

The basic principle of all of these techniques is inserting into the retro-reflected beam an optical element that renders a discriminant on a detector 46 (twin-element or quadrant). The output of the detector yields the S-curve which shows the pre-amplifier output voltage versus the relative position o helmet 12. FIG. 8 shows as an example of the astigmatic lens approach for achieving focus control.

If helmet 12 is at the focal plane of the objective, return beam 32 and return pulse 51 will also be collimated. If helmet 12 is too close to the objective, reflected beam 32 and return pulse 51 will return more divergent than incoming beam 26; if helmet 12 is too far from the objective, returning beam 32 and return pulse 51 will be more convergent. If an astigmatic lens 104 is placed in reflected beam 32 and return pulse 51, it results in an intensity pattern that is either horizontally or vertically oriented with respect to quadrant detector (in FIGS. 8a and 8b). The position error signal (PES) is derived by taking the difference between the sum of the signals from detector 42, that is, the sum of sum A and C and sum B and D. When helmet 12 is in focus, the PES is zero; when helmet 12 is too close or too far, the PES is positive or negative, respectively.

The advantages of the astigmatic focusing techniques are insensitivity to quadrant detector positioning, lock-on range independent of detector size, and position error signal (PES) highly symmetric and independent of separation from helmet 12.

Figure 9:
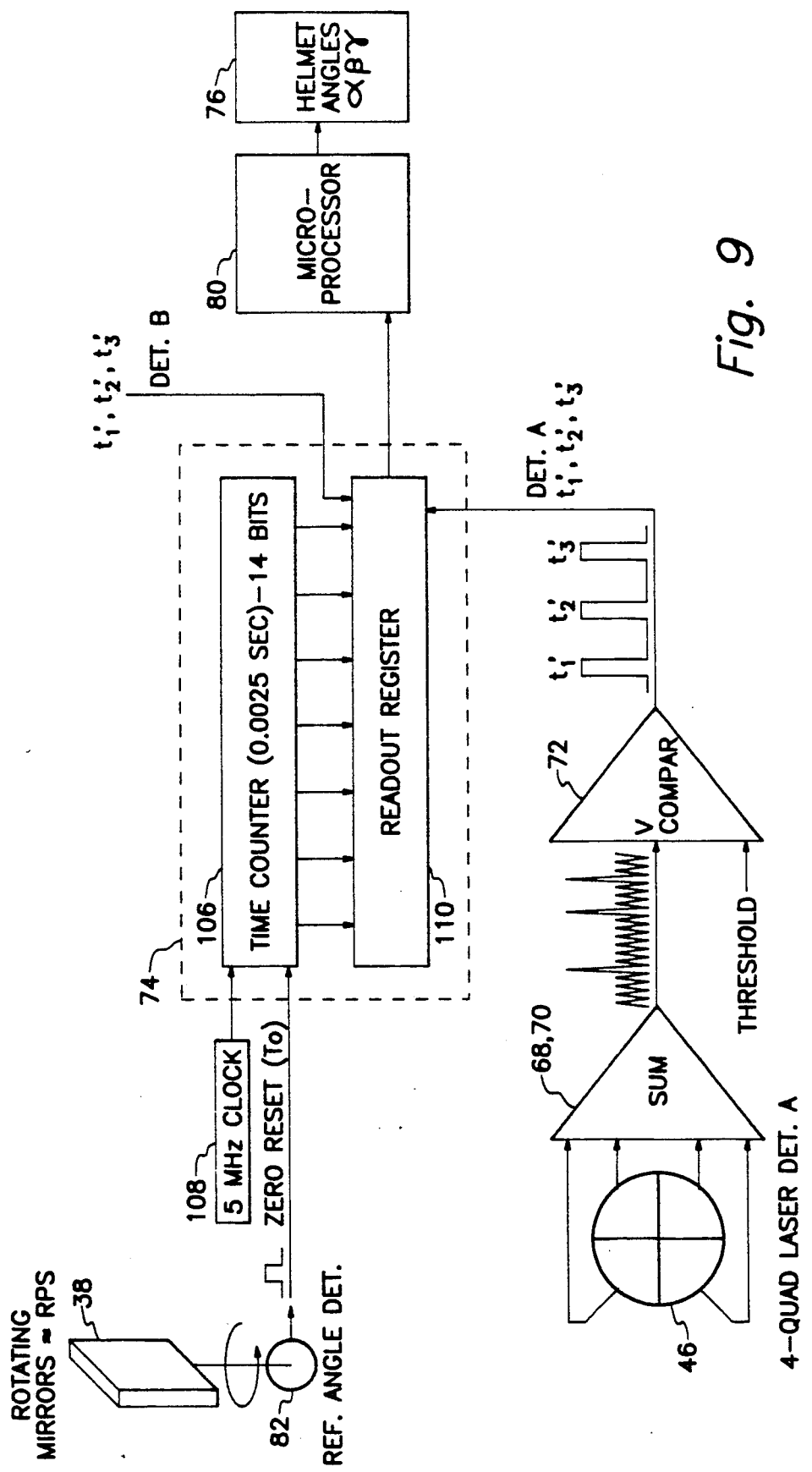
FIG. 9 is a diagram of the front end electronics.

FIG. 9 is a block diagram of front electronics for the invention. The three crossing times of laser beam 26 scanning across pattern 14 of helmet 12 occur at times $t_1$, $t_2$ and $t_3$. These crossing times are measured using a digital counter 106 counting the pulses of a give megahertz clock 108. Counter 106 is reset to 0 ($t_0$) for each laser scan across helmet 12 using a reference angle detector 82 mounted on rotating beam scanning mirror 38. The actual beam pattern crossings are picked up by reflected laser light 32 into four-quadrant laser detector 46. The signals from all four quadrants are summed in summers 68 and 70 and passed through a threshold comparator 72 to clean up noise. The resulting cleaned up signal contains all three cross signals in sequence, $t_1$, $t_2$ and $t_3$. These three signals store the counter's 106 time count at those three instances in a readout register 110, and send them to microprocessor 80. A similar scheme picks up the timing signals from laser scanning beam 26 and detector 46 on the opposite side of helmet 12. Assuming a 100 revolution per second mirror speed and a 90° field of view, the total time count is about 2.5 milliseconds (14 bits). The desired 0.3 milliradian angle resolution then corresponds to about 0.5 microsecond of time resolution. Five megahertz clock 108 per bit is better than 0.2 microsecond time resolution.

Only an engraved groove or corner reflector pattern on helmet 12 is required which does not increase the weight of helmet 12. The present invention has at least two moving parts which are scanner 38 and focusing lens 36.

We claim:

1. A scanning laser helmet mounted sight system comprising:
    laser light source means for providing a first light beam;
    beam splitting means for passing the first light beam;
    first reflecting means, mounted at a reference point, for reflecting the first light beam as a second light beam at a reference time;
    second reflecting means, mounted on a helmet, for reflecting the first light beam as a third light beam;
    detecting means for detecting the second and third light beams; and
    beam splitting means, situated in a path of the first, second and third light beams, for passing the first light beam on to said first and second reflecting means and for reflecting the second and third beams to said detecting means.

2. System of claim 1, further comprising:
    scanning means for scanning the first light beam across first and second reflecting means and for reflecting the second and third beams to said beam splitting means; and
    processing means, connected to said detecting means, for processing signals from said detecting means, due to second and third light beams, to determine a position of the helmet.

3. System of claim 2, wherein said laser light source means is a near-infrared laser.

4. A scanning laser helmet mounted sight system comprising:

first laser light source means for providing a first light beam;

first beam splitting means for passing the first light beam;

first reflecting means, mounted at a first reference point, for reflecting the first light beam as a second light beam at a first reference time;

second reflecting means, mounted on a helmet, for reflecting the first light beam as a third light beam;

first detecting means for detecting the second and third light beams;

first beam splitting means, situated in a path of the first, second and third light beams, for passing the first light beam on to said first and second reflecting means and for reflecting the second and third beams to said first detecting means;

second laser light source means for providing a fourth light beam;

second beam splitting means for passing the fourth light beam;

third reflecting means, mounted at a second reference point, for reflecting the fourth light beam as a fifth light beam at a second reference time;

fourth reflecting means, mounted on the helmet, for reflecting the fourth light beam as a sixth light beam;

second detecting means for detecting the fifth and sixth light beams; and second beam splitting means, situated in a path of the fourth, fifth and sixth light beams, for passing the fourth light beam on to said third and fourth reflecting means and for reflecting the fifth and sixth beams to said second detecting means.

5. System of claim 4, further comprising:

first scanning means for scanning the first light beam across said first and second reflecting means and for reflecting the second and third beams to said first beam splitting means;

second scanning means for scanning the fourth light beam across said third and fourth reflecting means and for reflecting the fifth and sixth beams to said second beam splitting means; and processing means, connected to said first and second detecting means, for processing signals from said first and second detecting means, due to second, third, fifth and sixth light beams, to determine a position of the helmet.

6. System of claim 5, wherein said first and second laser light source means are near-infrared lasers.

* * * * *